United States Patent [19]

Davis

[11] Patent Number: 5,199,142

[45] Date of Patent: Apr. 6, 1993

[54] PRODUCTION OF EXPANDED METAL STRIP FOR REINFORCING A RESILIENT PRODUCT

[75] Inventor: Robert W. Davis, Xenia, Ohio

[73] Assignee: The Gem City Engineering Co., Dayton, Ohio

[21] Appl. No.: 754,942

[22] Filed: Sep. 4, 1991

[51] Int. Cl.⁵ ............................................. B21D 31/04
[52] U.S. Cl. ........................................ 29/6.1; 72/203
[58] Field of Search .................... 29/6.1, 6.2; 428/131; 72/203, 204

[56] References Cited

U.S. PATENT DOCUMENTS

| | | | |
|---|---|---|---|
| 1,267,978 | 5/1918 | Collinson | 29/6.1 X |
| 2,290,842 | 7/1939 | Bush . | |
| 4,305,187 | 12/1981 | Iwamara et al. | 29/6.1 X |
| 4,921,118 | 5/1990 | Gass | 29/6.1 X |

*Primary Examiner*—Timothy V. Eley

*Attorney, Agent, or Firm*—Jacox & Meckstroth

[57] ABSTRACT

The opposite edge portions and the center portion of a continuous strip of sheet metal are progressively sheared with longitudinally spaced and laterally extending slits to form opposing U-shaped tabs having corresponding edge portions and successively connected by corresponding center portions of the strip. The sheared strip is fed between first and second overlapping sets of power driven pinch rollers which progressively grip the edge and center portions, respectively, and the second set of pinch wheels is longitudinally offset and driven at a higher peripheral speed to produce precisely uniform expansion of the strip by deforming the U-shaped tabs into V-shaped tabs. A hot melt adhesively impregnated flexible filament is progressively attached to the expanded portions of the strip while the strip is heated, and the expanded strip is progressively formed into a channel which is fed into an extrusion head for producing a reinforced rubber-like weatherstrip.

13 Claims, 1 Drawing Sheet

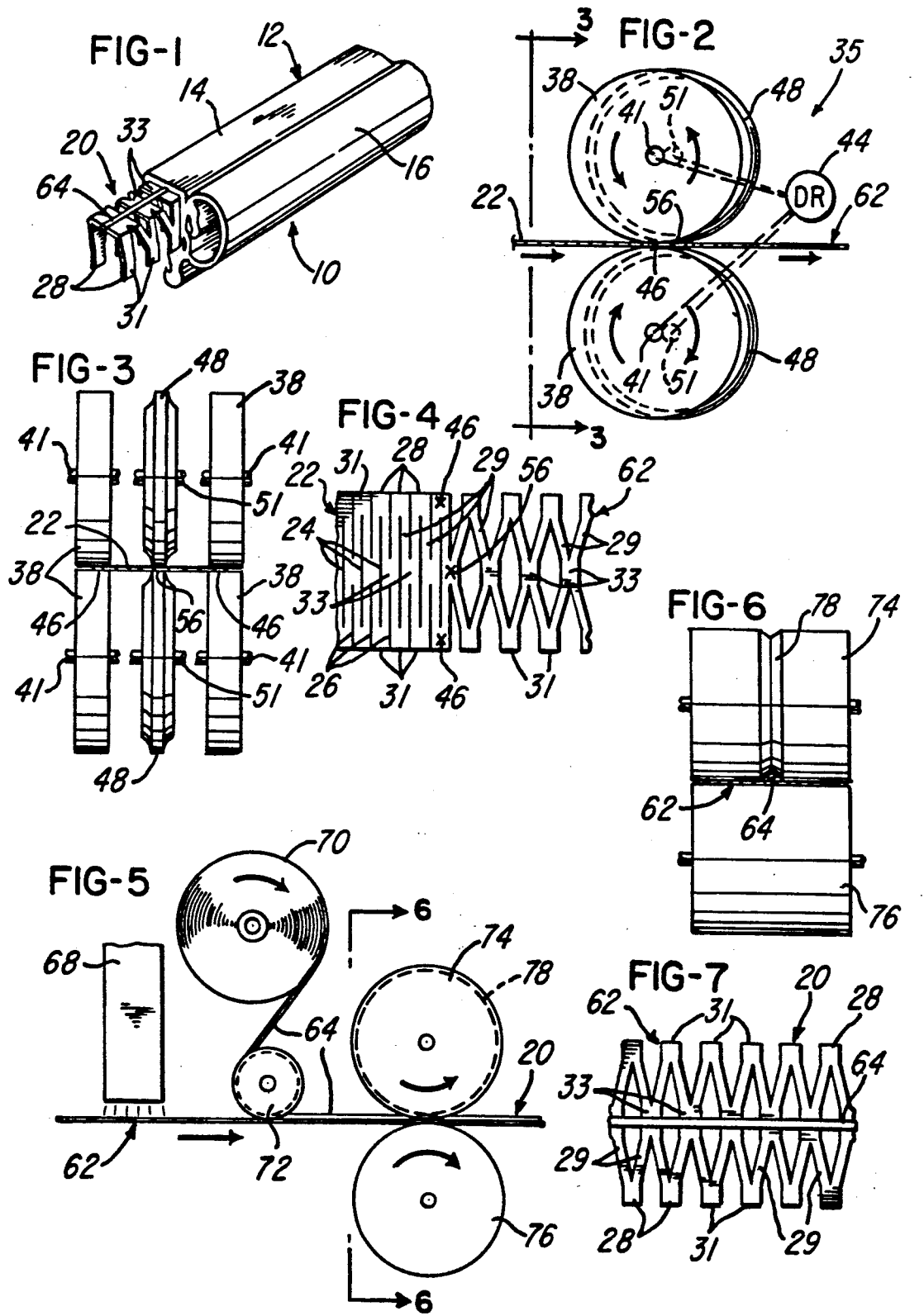

PRODUCTION OF EXPANDED METAL STRIP FOR REINFORCING A RESILIENT PRODUCT

BACKGROUND OF THE INVENTION

In the production of rubber or rubber-like weatherstrips of the type commonly used on motor vehicles around the doors, windows and trunk covers, it is common to reinforce each weatherstrip with a formed metal element which is continuously fed through an extruder head having a die for forming the weatherstrip with the desired cross-sectional configuration. One type of continuous reinforcing strip which has been used is in the form of a serpentine-shaped continuous wire to which is stitched longitudinally extending thread-like filaments. Another form of metal reinforcing strip is disclosed in U.S. Pat. No. 2,290,842 wherein a flat strip of sheet metal is fed between a pair of driven cutting and forming rolls 26 and 27 (FIG. 5) which slit the strip, as shown in FIGS. 2 or 7. The slit strip is then fed around a higher speed drum 39 against which the strip is held by a pressure roll 40. The higher peripheral speed of the drum 39 is used to stretch the slit strip to an expanded strip, as shown in FIGS. 3 and 8. The edge portions of the expanded strip are then rolled around longitudinally extending wires 3, which limit further stretching of the strip. The strip is bent along the fold lines 10 and 11 to form either of the channel-shaped expanded metal reinforcing strips shown in FIGS. 1 and 6.

It has been determined that the cutting and expanding apparatus disclosed in FIG. 5 of U.S. Pat. No. 2,290,842 does not produce uniform and precision expansion of the cut sheet metal strip. It has also been found undesirable to feed a non-uniformly expanded strip into an extrusion head, and a rubber-like weatherstrip with a non-uniform reinforcing insert is undesirable. Furthermore, the operation of attaching the wires 3 is relatively slow and expensive.

SUMMARY OF THE INVENTION

The present invention is directed to the production of an improved expanded metal strip for reinforcing a rubber-like product and of the general type disclosed in the above mentioned U.S. Pat. No. 2,290,842. As one important feature, an expanded metal strip is produced in accordance with the present invention by high speed progressive expansion of a cut or sheared metal strip in a manner which forms a continuous expanded metal strip with precision and uniform spacing between the successive expanded portions of the strip. In addition, the present invention provides for a uniformally expanded metal strip having a longitudinally extending and continuous non-stretchable flexible element or filament which connects the expanded portions of the strip. The filament prevents further expansion or extension of the strip while it is being handled and fed through an extrusion head and also prevents stretching or extension of the extruded rubber-like weatherstrip body during installation and use on a motor vehicle.

In accordance with a preferred embodiment of the invention, the above features and advantages are obtained by feeding a cut or slit sheet metal strip between two sets of driven pinch rollers. The first set of pinch rollers grips opposite edge portions of the strip, and the second set of pinch rollers grips center portions of the strip slightly downstream of the first set of rollers. The second set of rollers is driven at a substantially higher peripheral speed in order to obtain high speed and uniform expansion of the strip. A flexible string-like filament impregnated with a hot melt adhesive is fed into contact with expanded portions of the metal strip after the strip is heated, and the expanded strip and attached filament are fed between pressure rollers which cool the strip and adhesive for positively securing the filament to the expanded portions of the strip.

Other features and advantages of the invention will be apparent from the following description, the accompanying drawing and the appended claims.

BRIEF DESCRIPTION OF THE DRAWING

FIG. 1 is a fragmentary perspective view of a weatherstrip reinforced by an expanded metal insert strip constructed in accordance with the invention;

FIG. 2 is a diagramatic elevational view of the sets of pinch rollers which expand a cut or slit sheet metal strip in accordance with the invention;

FIG. 3 is a diagramatic view of the pinch rollers, as taken generally on the line 3—3 of FIG. 2;

FIG. 4 is a fragmentary section of the cut metal strip as it is being expanded by the sets of pinch rollers shown on FIGS. 2 and 3;

FIG. 5 is a diagramatic elevational view of apparatus for attaching and securing a flexible string-like filament to the expanded metal strip;

FIG. 6 is a section taken generally on the line 6—6 of FIG. 5; and

FIG. 7 is a fragmentary section of an expanded metal strip and attached filament produced in accordance with the invention and prior to being bent to form a channel for feeding into an extrusion head to produce the reinforced weatherstrip shown in FIG. 1.

DESCRIPTION OF THE PREFERRED EMBODIMENT

FIG. 1 illustrates a typical reinforced weatherstrip 10 having an extruded rubber or rubber-like body 12 formed by a channel shaped portion 14 and a resilient and flexible bulbous or tubular portion 16. If desired, the body 12 may be extruded with a dual durometer with the channel portion 14 having a higher durometer than the resilient tubular portion 16.

In accordance with the present invention, the body 12 is reinforced with a continuous and longitudinally extending expanded sheet metal reinforcing strip 20 which is fed into the extruder head to form a reinforcing insert within the channel portion 14 of the rubber-like body 12. As shown in FIG. 4, the expanded metal strip 20 is produced by first cutting or shearing a strip 22 of thin sheet metal with longitudinally spaced and laterally extending slits 24 and 26. The slits define opposing pairs of U-shaped tabs 28 each having parallel leg portions 29 integrally connected by a corresponding edge portion 31. The leg portions 29 of adjacent tabs 28 are integrally connected by corresponding center portions 33.

After the strip 22 is sheared or cut with the slits 24 and 26, the strip may be coiled for transport and/or storage or immediately fed into an expanding mechanism 35, as diagramatically shown in FIGS. 2 and 3. The mechanism 35 includes a set of two pairs of opposing pinch wheels or rollers 38 which are supported by corresponding shafts 41 with each pair of rollers 38 in opposing relation. The rollers 38 are all driven at a selected common speed by a variable speed motor drive unit 44, and the rollers 38 are positioned to engage the edge portions 31 of each pair of opposing tabs 28. The corresponding nips of each pair of rollers 38 grip the edge portions of the strip 22 along corresponding lines which pass through spots 46.

The expanding mechanism 35 also includes a pair of opposing gripping wheels or rollers 48 which are supported between the two pairs of rollers 38 by corresponding shafts 51. The rollers 48 are also driven by the drive unit 44, but at a substantially higher speed, approximately twice the speed of the rollers 38. Preferably, the rollers 38 and 48 are driven through corresponding thin spur gears (not shown). As shown in FIG. 2, the rollers 48 are positioned slightly downstream of the rollers 38 and form a nip 56 (FIG. 2) which successively engages the center portions 33 of the strip 22. As shown in FIG. 4, the nip 56 formed by the rollers 48 is downstream from the nips 46 formed by the rollers 38 by a distance equal to the width of a leg portion 29 or corresponding generally to the width of the tabs 28.

As the cut or sheared strip 22 is fed into the nips formed by the rollers 38 and 48, the strip is precisely and uniformly expanded into an expanded strip 62 (FIG. 4). The corresponding edge portions 31 and the center portions 33 are spaced longitudinally by a uniform distance, and the U-shaped tabs 28 with parallel leg portions 29 are deformed into V-shaped tabs 28 with diverging leg portions 29. The leg portions 29 of each tab 28 are integrally connected by a corresponding edge portion 31, and the adjacent leg portions 29 of adjacent tabs 28 are integrally connected by a center portion 33.

Referring to FIGS. 5-7, the expanded metal strip 62 may be wound into a coil for storage or transport or may be fed directly into forming rollers which bend the strip 62 into a U-shaped reinforcing channel similar to the strip 20 shown in FIG. 1. However, preferably the expanded metal strip 62 receives a flexible and non-stretchable string-like element 64. The flexible element 64 includes fiberglass filaments which are impregnated with a heat sensitive or hot melt adhesive. However, the flexible element 64 may also be formed of other non-stretchable materials such as a filament tape bonded to the strip 62 with suitable pressure sensitive adhesive.

As shown in FIG. 5, the expanded metal strip 62 is heated by a hot air blower 68, and the heated strip 62 is fed into contact with the flexible line or filament 64 impregnated with hot melt adhesive and supplied from a spool 70. The filament or element 64 is fed around a guide roller or wheel 72 into contact with the heated strip 62, and the assembly is fed between a pair of pinch rollers 74 and 76. The rollers 74 and 76 press the filament 64 into firm contact with the expanded strip 62 and also help cool or dissipate heat from the expanded metal strip 62 to form the expanded sheet metal insert strip 20. The roller 74 has a circumferentially extending groove 78 which locates the filament 64 relative to the expanded strip 62 during the bonding operation. The bonded filament 64 maintains the uniform expansion of the strip 62 and prevents further expansion or extension of the strip after it is inserted into the rubber-like weatherstrip body 12. The bonding of the rubber-like material to the expanded metal strip 62 and filament 64 also prevents extension and tearing of the weatherstrip body 12.

From the drawing and the above description, it is apparent that an expanded metal reinforcing strip constructed in accordance with the present invention, provides desirable features and advantages. As one primary advantage, the expansion of the cut or slit strip 22 into the expanded strip 62 by the pinch roller mechanism 35 provides for high speed expansion of the strip and assures that the strip is uniformly and precisely expanded. As another feature, the adhesive bonding or attachment of the flexible string-like filament 64 to the expanded metal strip 62 is effective to prevent further expansion of the expanded strip 62 and extension or elongation of the weatherstrip body 12 as the weatherstrip 10 is being produced and installed on a motor vehicle and during extended use of the weatherstrip on the vehicle.

While the form of expanded metal reinforcing strip and the method and apparatus herein described for producing the strip constitute a preferred embodiment of the invention, it is to be understood that the invention is not limited to the precise article, method and apparatus disclosed, and that changes may be made therein without departing from the scope and spirit of the invention as defined in the appended claims.

The invention having thus been described, the following is claimed:

1. A method of producing an expanded metal strip adapted to be used for reinforcing a resilient weatherstrip product, comprising the steps of progressively shearing a continuous thin strip of metal with longitudinally spaced and laterally extending slits to define longitudinally connected opposing U-shaped tabs each having a pair of generally parallel leg portions and with the leg portions of each tab integrally connected by a separate corresponding edge portion of the strip and the adjacent leg portions of adjacent tabs integrally connected by a separate corresponding center portion of the strip, feeding the strip between a first set of continuously moving opposing gripping members positioned for progressively gripping the edge portions of the strip and a second set of continuously moving opposing gripping members positioned between the first set of gripping members for progressively gripping the center portions of the strip, positioning the second set of gripping members downstream of the first set of gripping members by a predetermined distance corresponding generally to the width of the tabs, and driving the first and second sets of gripping members at differential surface speeds with the second set moving at a speed substantially greater than the speed of the first set to effect continuous and uniform expansion of the strip to separate corresponding edge portions and center portions in longitudinally spaced relation by progressively deforming the opposing U-shaped tabs into opposing V-shaped tabs.

2. A method as defined in claim 1 wherein the first set of gripping members comprises two pair of opposing pressure rollers forming nips positioned for simultaneously gripping the edge portions of a pair of opposing U-shaped tabs.

3. A method as defined in claim 2 wherein the second set of gripping members comprises a pair of opposing pressure rollers forming a nip position to grip the center portion integrally connecting the leading leg portions of the pair of opposing tabs.

4. A method as defined in claim 1 and including the step of progressively bonding a continuous generally non-stretchable flexible element to longitudinally spaced portions of the strip after the strip is expanded.

5. A method as defined in claim 4 wherein the flexible element is bonded to the longitudinally spaced center portions of the strip.

6. A method as defined in claim 4 wherein the flexible element comprises an adhesive impregnated flexible element, and including the steps of progressively heating the expanded strip while feeding the flexible element into contact with the longitudinally spaced portions of the strip.

7. Apparatus for producing an expanded metal strip adapted to be used for reinforcing a resilient weatherstrip product, the strip having longitudinally spaced and laterally extending slits to define longitudinally connected opposing U-shaped tabs each having a pair of generally parallel leg portions and with the leg portions of each tab integrally connected by a separate corresponding edge portion of the strip and the adjacent leg portions of adjacent tabs integrally connected by a separate corresponding center portion of the strip, said apparatus comprising a first set of opposing gripping members positioned for progressively gripping the edge portions of the strip and a second set of opposing gripping members positioned between the first set of gripping members for progressively gripping the center portions of the strip, the second set of gripping members being positioned downstream of the first set of gripping members by a predetermined distance corresponding generally to the width of the tabs, and means for driving said first and second sets of gripping members at differential surface speeds with said second set moving at a speed substantially greater than the speed of said first set to effect progressive and uniform expansion of the strip to separate corresponding edge portions and center portions in longitudinally spaced relation.

8. Apparatus as defined in claim 7 wherein said first set of gripping members comprises two pair of opposing pressure rollers forming nips positioned for simultaneously gripping the edge portions of a pair of opposing U-shaped tabs.

9. Apparatus as defined in claim 8 wherein said second set of gripping members comprises a pair of opposing pressure rollers forming a nip position to grip the center portion integrally connecting the leading leg portions of the pair of opposing tabs.

10. Appartus as defined in claim 7 and including means for progressively bonding a continuous generally non-stretchable flexible element to longitudinally spaced portions of the strip after the strip is expanded.

11. Apparatus as defined in claim 10 and including means for progressively heating the expanded strip while feeding the flexible element into contact with the longitudinally spaced portions of the strip.

12. A method of producing an expanded metal strip adapted to be used for reinforcing a resilient weatherstrip product, comprising the steps of progressively shearing a continuous thin strip of metal with longitudinally spaced and laterally extending slits to define longitudinally connected opposing U-shaped tabs each having a pair of generally parallel leg portions and with the leg portions of each tab integrally connected by a separate corresponding edge portion of the strip and the adjacent leg portions of adjacent tabs integrally connected by a separate corresponding center portion of the strip, feeding the strip between a first set of continuously rotating opposing gripping rollers positioned for progressively gripping the edge portions of the strip and a second set of continuously rotating opposing gripping rollers positioned between the first set of gripping rollers for progressively gripping the center portions of the strip, positioning the second set of gripping rollers downstream of the first set of gripping rollers by a predetermined distance, and driving the first and second sets of gripping rollers at differential surface speeds with the second set moving at a speed substantially greater than the speed of the first set to effect continuous and uniform expansion of the strip to separate corresponding edge portions and center portions in longitudinally spaced relation by progressively deforming the opposing U-shaped tabs into opposing V-shaped tabs.

13. Apparatus for producing an expanded metal strip adapted to be used for reinforcing a resilient weatherstrip product, the strip having longitudinally spaced and laterally extending slits to define longitudinally connected opposing U-shaped tabs each having a pair of generally parallel leg portions and with the leg portions of each tab integrally connected by a separate corresponding edge portion of the strip and the adjacent leg portions of adjacent tabs integrally connected by a separate corresponding center portion of the strip, said apparatus comprising a first set of opposing gripping rollers positioned for progressively gripping the edge portions of the strip and a second set of opposing gripping rollers positioned between the first set of gripping rollers for progressively gripping the center portions of the strip, the second set of gripping rollers being positioned downstream of the first set of gripping rollers by a predetermined distance, and means for driving said first and second sets of gripping rollers at differential surface speeds with said second set moving at a speed substantially greater than the speed of said first set to effect progressive and uniform expansion of the strip to separate corresponding edge portions and center portions in longitudinally spaced relation.

* * * * *